United States Patent
Zuteck (10) Patent No.: US 8,061,964 B2
(45) Date of Patent: Nov. 22, 2011

(54) HYBRID MULTI-ELEMENT TAPERED ROTATING TOWER

(76) Inventor: Michael Zuteck, Clear Lake Shores, TX (US)

(*) Notice: Subject to any disclaimer, the term of this patent is extended or adjusted under 35 U.S.C. 154(b) by 44 days.

(21) Appl. No.: 12/554,884

(22) Filed: Sep. 5, 2009

(65) Prior Publication Data

US 2011/0058944 A1    Mar. 10, 2011

(51) Int. Cl.
*F03D 7/02* (2006.01)
(52) U.S. Cl. ....... 415/4.3; 415/908; 416/232; 52/651.01
(58) Field of Classification Search .................. 415/4.3, 415/4.5, 905, 908, 4.1; 416/10, 11, 131, 416/132 B, 132 A, 9, 117, 232, 241 B; 290/43, 290/44, 52, 54, 55; 52/651.01, 651.02, 651.05, 52/651.09, 651.846, 40, 110
See application file for complete search history.

(56) References Cited

U.S. PATENT DOCUMENTS

| | | | |
|---|---|---|---|
| 4,156,580 A | 5/1979 | Pohl | |
| 4,180,369 A | 12/1979 | Ottosen | |
| 4,323,331 A | 4/1982 | Schachle | |
| 4,330,714 A | 5/1982 | Smith | |
| 4,334,823 A | 6/1982 | Sharp | |
| 4,366,387 A | 12/1982 | Carter, Jr. | |
| 4,408,958 A | 10/1983 | Schacle | |
| 4,456,429 A | 6/1984 | Kelland | |
| 4,522,564 A * | 6/1985 | Carter et al. | 416/140 |
| 4,533,297 A | 8/1985 | Bassett | |
| 4,710,100 A | 12/1987 | Laing | |
| 4,979,871 A | 12/1990 | Reiner | |
| 5,213,470 A * | 5/1993 | Lundquist | 416/9 |
| 5,375,324 A | 12/1994 | Wallace | |
| 6,157,088 A | 12/2000 | Bendix | |
| 6,602,045 B2 * | 8/2003 | Hickey | 415/1 |
| 6,749,399 B2 | 6/2004 | Heronemus | |
| 6,926,491 B2 | 8/2005 | Migler | |
| 6,951,443 B1 | 10/2005 | Blakemore | |
| 6,952,058 B2 | 10/2005 | McCoin | |
| 6,966,747 B2 | 11/2005 | Taylor | |
| 6,979,175 B2 | 12/2005 | Drake | |
| 7,014,416 B2 | 3/2006 | Lund | |
| 7,040,859 B2 | 5/2006 | Kane | |
| 7,296,971 B2 | 11/2007 | Borgen | |
| 2006/0213145 A1 * | 9/2006 | Haller | 52/651.01 |

(Continued)

FOREIGN PATENT DOCUMENTS

| | | |
|---|---|---|
| GB | 190910194 A | 0/1910 |
| GB | 674651 A | 6/1952 |
| GB | 780381 A | 7/1957 |
| GB | 2288637 A | 8/1995 |
| GB | 2356431 A | 5/2001 |
| WO | WO-2008087181 A1 | 7/2008 |

*Primary Examiner* — Edward Look
*Assistant Examiner* — Dwayne J White
(74) *Attorney, Agent, or Firm* — David McEwing (57) ABSTRACT

The specification discloses a rotating turbine tower. The tower rotates to maintain the turbine facing into the wind. This allows structure optimization. The tower structure is comprised of a leading edge and a trailing edge, with joining panels between the edge structures. The tower edges are the main structural components of the tower. The separation of the edges tapers to follow the bending moment on the tower, reducing the need to taper material thickness. The tapering shape of the tower structure matches the primary edgewise moment distribution. The tower can be assembled on site from components, thereby facilitating transportation to the tower site. The material properties and shape can be selected based upon the tower maintaining a near constant orientation with the wind. This can save weight and costs. The tower architecture can be of differing shapes such as a triangle or a structure tapering at each end.

25 Claims, 9 Drawing Sheets

U.S. PATENT DOCUMENTS

| | | |
|---|---|---|
| 2007/0108776 A1 | 5/2007 | Siegfriedsen |
| 2007/0294955 A1 | 12/2007 | Sportel |
| 2008/0040983 A1 | 2/2008 | Fernandez Gomez |
| 2008/0072511 A1 | 3/2008 | Phuly |
| 2009/0021019 A1 | 1/2009 | Thomsen |
| 2009/0126313 A1 | 5/2009 | Jolly |
| 2009/0167023 A1* | 7/2009 | Nies ................................ 290/55 |
| 2009/0211173 A1 | 8/2009 | Willey et al. |
| 2010/0117369 A1* | 5/2010 | Monostory ..................... 290/55 |

* cited by examiner

HYBRID MULTI-ELEMENT TAPERED ROTATING TOWER

BACKGROUND TO INVENTION

1. Intended Use

The invention is an advantageous construction of a rotatable wind turbine tower. The turbine includes the rotor and nacelle. The turbine is attached at the top of the tower and changes direction with the rotation of the tower. The tower has a narrow profile in one dimension and a broad profile in a second dimension. This shape, combined with bearings, allows the tower to change orientation in response to changes in wind direction, aligning the structure with the wind direction to optimally carry the loads, and thereby reducing the weight and cost of the tower.

2. Related Technology

Wind powered turbines are known. Most of these turbines utilize a stationary tower and the turbine rotates 360° in a horizontal plane at the top of the tower.

Some attempts have been made to construct a wind turbine with a tower that turns with the direction of the wind. See UK patent 780,381 wherein a rotating tower is stabilized by 3 legs and the turbine and generator are located at ground level. See also UK patent 10,194 wherein the tower is constructed to turn freely to the wind on two rollers or ball bearings, one being at the base of the girder framework and the other immediately under the "wind wheel" or wind turbine. The rollers or ball bearings under the wind wheel consist of an annular ring designed to prevent the girder framework from having any upward or side motion. The girder framework remains free to revolve by means of rollers attached to the framework. To keep the girder framework or tower in an upright position the annular ring is provided with suitable eyes or holes and securely anchored to the ground by means of steel guy ropes or rods. The rotating truss tower was not aerodynamically shaped.

SUMMARY OF INVENTION

The specification discloses a tower structure having a wing like shape wherein the wing is set upright on its end, i.e., a narrow crosswind thickness, an expanding along-wind width and a long double tapering structure along its height. Also disclosed is a tower structure having a triangular shape with height.

The tower structure may have a straight leading edge extending to the height of the structure. The narrow leading edge faces the wind direction and minimizes wind drag and turbulence. The tower structure also contains a trailing edge similarly extending over the height of the structure. The trailing edge may bow outward expanding the width of the structure part way up the height of the structure. The trailing edge may taper toward the leading edge proximate to the tower ends. As used herein, the "upper tower segment" means that portion of the tower where the trailing edge tapers above the maximum outward bowing of the trailing edge to the leading edge. The triangular shaped structure merges the trailing edge into the leading edge proximate to the top of the tower.

The leading edge may maintain a uniform longitudinal axis. The trailing edge may be configured in a bowed or kinked shape, i.e., the distance between the leading edge and trailing edge can vary along the height of the structure. The leading edge and trailing edge are the primary load bearing elements of the tower.

The leading edge and trailing edge may be comprised of strong high modulus material such as metal or composite material containing high strength fibers, e.g. unidirectional glass or carbon fibers. The leading edge/trailing edge may also be steel. The leading edge or trailing edge may be in a half circular shape. Other shapes are possible. For example the leading edge may have an elliptical shape, and the trailing edge may have a flat shape.

The side panels of the structure may be comprised of double bias (DB) glass. Other materials that may be used include but are not limited to plastics, fiber reinforced plastics, or panels over diagonal truss bracing. The side panels may be oriented to provide joining between the leading edge and trailing edge. The side panels may also be aerodynamically shaped both in height and width.

The tower rotates with changes in wind direction. The rotor and the nacelle are fixedly mounted to the top end of the tower. As used herein, the term "rotor" includes the blades and the hub. The "nacelle" may include the main rotor bearings, generator, gear box, and associated equipment. The yaw motor will be either at the mid tower collar and bearing assembly, or more likely at the tower base. Rotation of the tower, rotor and nacelle occurs by operation of a lower rotation assembly (hereinafter "bottom bearing assembly") mounted approximately at ground level and a upper bearing assembly attached to the tower below the turbine rotor blades (hereinafter "mid-tower"). Additional or alternative bearing assemblies may be utilized. An acceptable bearing assembly includes the ability to carry side loads and permit rotation of the tower in 360°.

The upper bearing assembly comprises an annular structure surrounding the wing shaped tower structure. Activation of the yaw motor and the rotation of the tower through operation of the lower and upper bearing assemblies causes the tower leading edge to continuously point into the wind. This, in turn, points the turbine, fixed to the top of the tower, into the wind thereby enhancing energy production.

A second outer annular structure (hereinafter "mid-tower collar") may surround the upper bearing assembly. This second structure may be the attachment for reinforcing and stabilizing guy wires extending from the tower to the ground. The guy wires may be anchored into the ground. There may be three or more guy wires. For example, three guy wires would be space at approximately 120° apart. The second outer annular structure may also provide horizontal reinforcement for the upper bearing assembly.

In another embodiment, the tower may be a triangular shape. The shape is narrow at the top juncture with the turbine and has a broad base at the bottom. A structural concept of the invention includes matching the moment and taper. Therefore a tower with mid level support will have a double taper, whereas a tower with only a bearing assembly at the base will have only a single taper. The bearing assembly will be at ground level. The bearing assembly may include a turn table revolving device. This can include a rotatable horizontal disk that supports the tower. A yaw motor located at ground level can be used to turn the tower into the wind.

SUMMARY OF DRAWINGS

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

FIG. 1 illustrates a side view of the tower structure component including the leading edge and trailing edge. The leading edge is leaning into the wind. Also illustrated is the lower bearing assembly, the upper bearing assembly and the mid tower collar for anchoring guy wires. The tower vertical axis of rotation is also illustrated. Also illustrated is the nacelle showing the approximate size of the nacelle to the tower structure. This size may vary considerably. For example, the size of the nacelle would be larger if a large diameter direct drive generator were used.

DETAILED DESCRIPTION OF INVENTION

It will be appreciated that not all embodiments of the invention can be disclosed within the scope of this document and that additional embodiments of the invention will become apparent to persons skilled in the technology after reading this disclosure. These additional embodiments are claimed within the scope of this invention.

The contents of the section entitled Summary of Invention are incorporated into the Detailed Description of the Invention herein.

The construction of wind turbines and generation of electricity from these turbines has increased significantly in the last ten to twenty years. Most of these turbines utilize rotating blades and a nacelle containing a gear box and generator setting atop of a fixed positioned tower. The rotor and nacelle rotate atop of a stationary tower in response to changes in wind direction. This rotation may involve operation of a yaw motor.

There has been a goal to increase the size of the wind turbines. This goal encounters problems of transporting large structural components over land to the installation site. It also encounters problems with materials required to withstand wind loads from all directions and the corresponding increase in weight and material costs.

The wind turbine tower is typically cylindrically shaped and made from steel. The tower may have a tapering shape along the vertical axis. In other examples, the tower may have a derrick frame shape similar to farm windmills. Neither design is aerodynamically shaped. Since the towers are fixed in place, it is not possible to provide an aerodynamic or structurally optimized shape since the wind direction is variable. Structural optimization includes but is not limited to cost, shape, material, material configuration, and functionality.

The invention subject of this disclosure teaches constructing a tower structure from multiple pieces or segments (elements). The structure forms the leading edge and the trailing edge of the tower (sometimes collectively termed herein as "structural edges"). The structural edges are load carrying. The leading edge faces the on coming wind. Conversely the trailing edge is on the lee side of the tower. Rotation of the tower ensures the structure maintains this orientation to the wind. Utilizing this constant orientation, structural tower loads can be predicted based upon varying wind speeds. This predictability can allow the fabrication of the tower segments tailored to the position of each segment. The tower can be structurally optimized. Each segment can be designed to carry a specific load, allowing for cost effective utilization of materials (structural optimization). For example the structural segments, including attachment hardware, of the leading edge will experience both compression load and, in high wind, tension loads. The trailing edge segments may more often experience or be subject to compression loading. The segments can also be aerodynamically shaped based upon their position relative to the wind.

The segments can be in lengths that allow use of standard transportation methods. As discussed elsewhere herein, the trailing edge segment(s) may be sized to nest in the leading edge segment(s) (or vice versa) during transportation.

The invention subject of this disclosure teaches a tower that can rotate in reaction to changes in the wind. The tower rotates with the turbine (including the nacelle). This allows the tower to be designed to decrease the tower's drag in the wind. More important, the leading edge sees tension from variable wind thrust, with the trailing edge seeing or being subject to corresponding compression. Therefore the materials choice and placement can be optimized for each type of loading, thereby allowing reduction of high strength and high cost materials. In addition, the tapering width allows nearly uniform stress in these main structural members so their material is loaded efficiently, and the side panels need carry only modest amounts of shear and bending loads. There can be an overall weight savings from carrying the loads in this efficient manner, and transportation costs can be reduced because the tower segments are both smaller and lighter.

Figure 6:
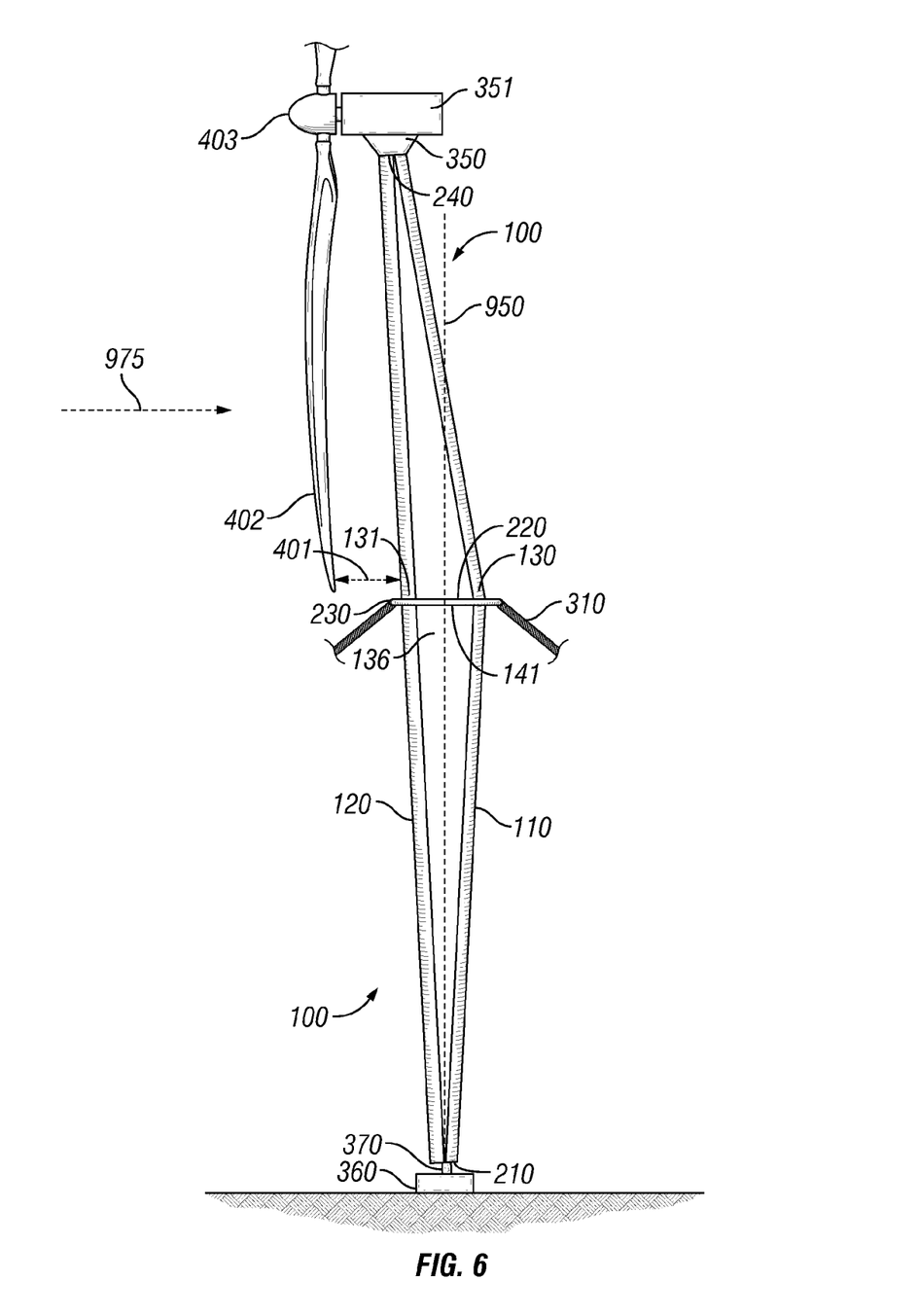
FIG. 6 is a side view of the double tapered tower wherein the leading edge leans forward outside of the axis of rotation. The relationship between the tower leading edge and the turbine blade is also illustrated.

Referencing FIG. 6, the tower has a vertical axis of rotation 950. The axis of rotation extends vertically upward from the bottom bearing assembly (proximate to the tower foundation 360 and pivot stalk 370) and through the middle of the upper bearing assembly 220. The tower can be constructed to allow portions of the structure to extend outside the axis of rotation. Particularly the leading edge may lean into the windward direction. This is termed "leaning forward". It will be appreciated that the tower 100 is leaning to the left and into the wind as shown by vector arrow 975. This configuration increases the distance between the tower leading edge and the plane of rotation of the turbine blades. The increased distance between the tower leading edge 110 and the turbine blade 402 is illustrated by distance 401. This minimizes potential for damage to the turbine blades by striking the tower. It also decreases the moment distribution from rotor thrust that must be carried by the tower and its supports. A downwind rotor can extend from the trailing edge 120 outside the axis of rotation 950. This position facilitates the generating of the necessary moment needed to steer the tower into a changed wind direction.

Figure 1:
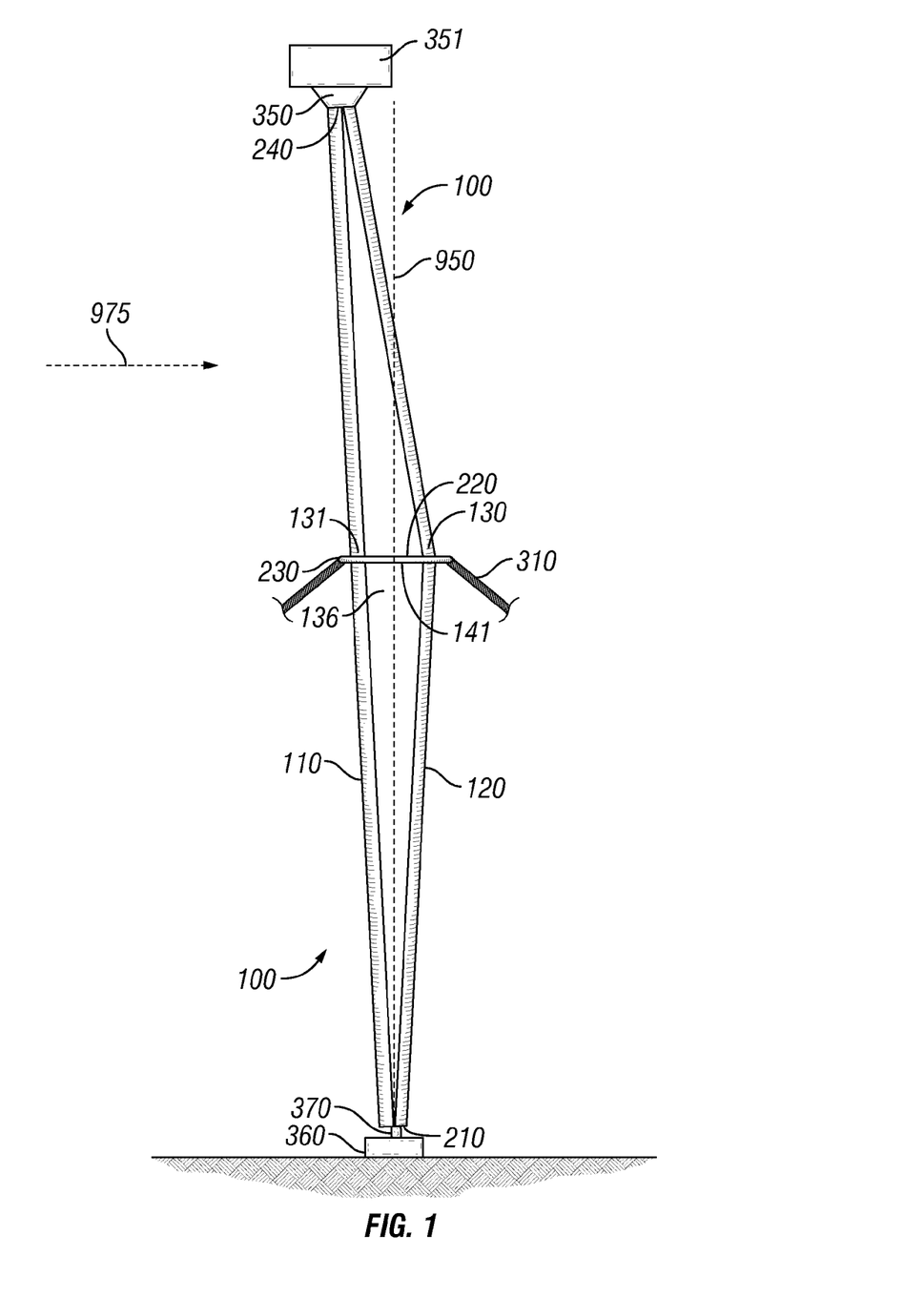
Figure 2A:
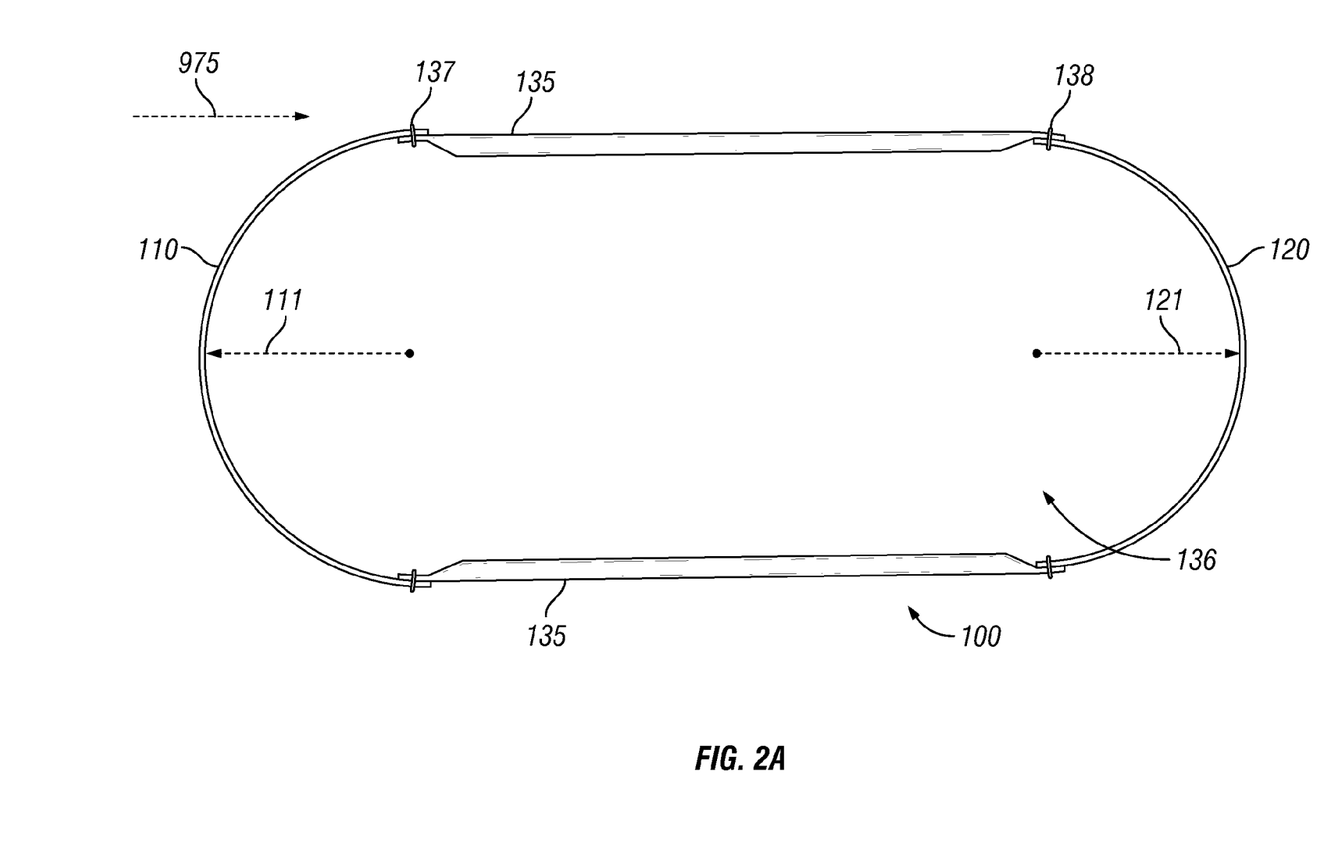
FIG. 2A illustrates a top down cross sectional view of the tower structure showing one embodiment of the leading edge, trailing edge and the side panels. Also illustrated is the radius of the leading edge and trailing edge.
Figure 2B:
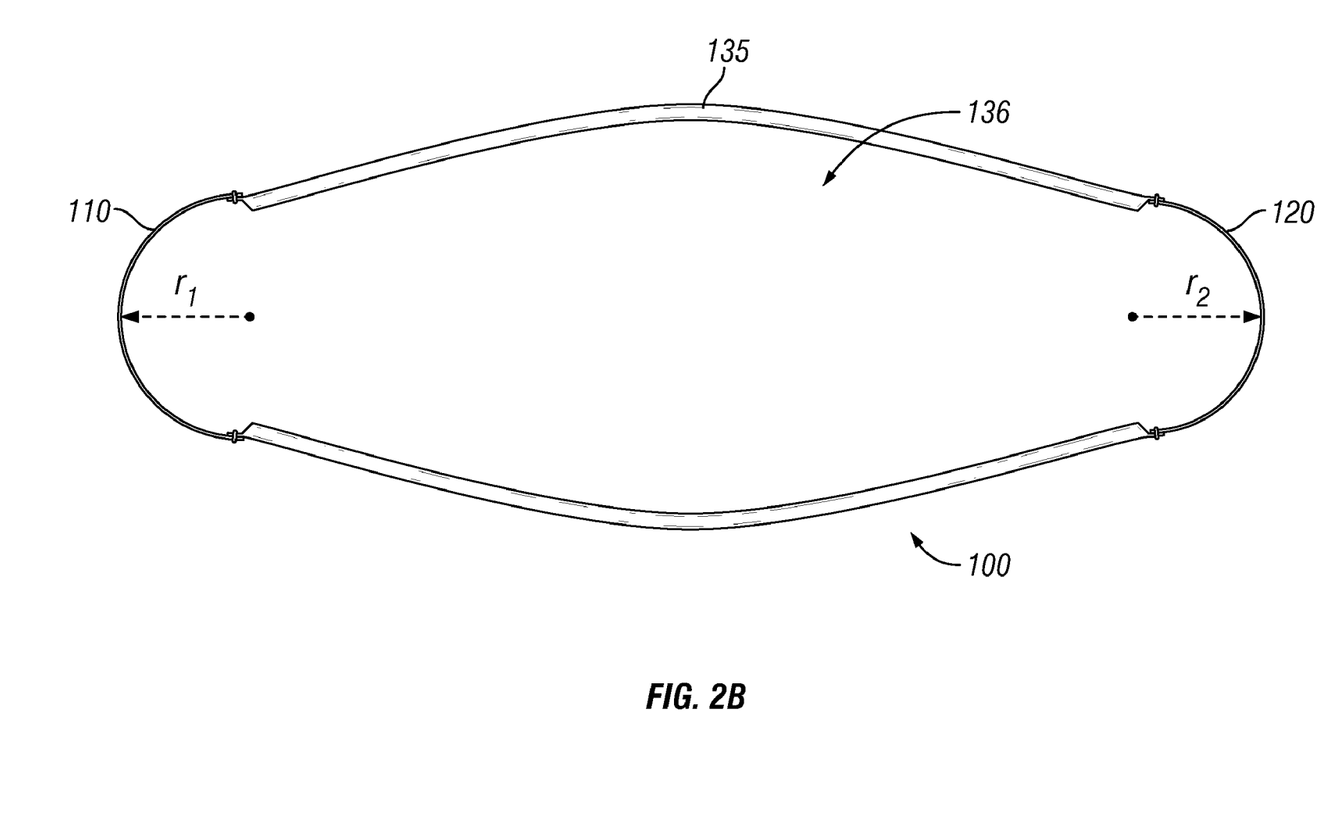
FIG. 2B illustrates a top view of a cross sectional perspective of a more elliptical tower structure. Also illustrated is the radius of the leading edge and the radius of the trailing edge. The radii may be of unequal lengths.

In one embodiment of the invention, the tower edgewise load is carried by the leading edge 110 and the separate trailing edge 120. See FIG. 1. This allows the sides of the tower structure to be covered with a lower load bearing material as stated in the preceding paragraph and further discussed in relation to FIG. 2. The tower edges define the outline of the wing shaped tower structure 100 illustrated in FIG. 1. The tower edges diverge at the tower mid point (kinked or bowed separation of the leading edge and trailing edge). The tower edges merge together at the bottom of the structure and are attached to the lower bearing assembly 210. Beneath the bottom bearing assembly (not shown) are a pivot stalk 370 and a foundation 360.

In the embodiment illustrated, the leading edge 110 leans forward into the wind. The leading edge is not vertical. The axis of rotation 950 is vertical. As illustrated in FIG. 1, the axis of rotation starts at the pivot stalk 370 and extends upward through the upper bearing assembly 220.

In one embodiment, (not shown) a hinge component connects the bottom segments of the leading edge and trailing edge with the foundation or with the bottom bearing assembly. Other placements of the bottom hinge are possible. This configuration allows the tower to pivot on the hinge and the lowering of the tower (and turbine) to be placed on the ground for servicing or repair. It may be found advantageous to attach the hinge to the leading edge, thereby ensuring that the turbine and blades will be facing downward when the tower is lowered. The trailing edge can also be attached with a hinge to the foundation or bottom bearing assembly. Accordingly the tower can be lowered using the leading edge hinge or the trailing edge hinge, depending upon the component of the turbine to be serviced. A hinge also allows the tower to be elevated and secured in the vertical position for initial erection.

The tower edges also merge 240 beneath the attachment fixture or base 350 for the rotor and nacelle 351. The orientation of the tower depicted in FIG. 1 to the wind direction is shown by vector arrow 975. The tower may be rotated in response to changes in the wind by use of a yaw motor or other device. Also illustrated is the space 136 between the leading and trailing edges. It is this space that is covered by the secondary load bearing material. See FIGS. 2 and 4.

See FIG. 2A comprising a cross-sectional top view of the tower structure. Illustrated are the leading edge 110 and trailing edge 120, side panels 135 and the narrow profile of the tower structure facing the wind 975. The leading edge defines the narrow profile.

Referencing FIG. 1, because the tower edge separation profile is similar to the linear moment profile from rotor thrust, loads in the leading and trailing edges are fairly constant and therefore a good match to a constant material cross-section. Related to this is that primary structural shear in the side panels and fasteners is low. The side panels may be a composite material. There will be kick loads at the kink 130 in the trailing edge load path, but the mid-tower collar 230 is installed at this location and may reinforce the trailing edge. Also interior structure such as wide flanges or a bulkhead integrated into the joining of upper and lower tower sections may be used to react to these kick loads.

In the embodiment illustrated in FIG. 1, the tower edges achieve maximum divergence approximately in the midpoint 130, 131 of the structure 100, i.e., mid-tower. This forms a kink or widest portion of the wing shaped tower structure. An upper bearing assembly 220 reacts the net loads from the two edges at or near this widest point. The upper tower section is above the upper bearing assembly. Of course, this upper bearing assembly facilitates the rotation of the tower structure. The bearing assembly comprises an annular structure surrounding the wing shaped tower structure 100. See FIG. 2A for a top cross sectional view of the tower structure and the position of the leading edge and trailing edge. Also illustrated in FIG. 2A is the narrow profile of the wing shaped tower. This narrow profile, combined with the design of the tower leading edge and trailing edge, minimize wind resistance of the tower and thereby lessens the load upon the tower components.

A second outer annular structure (mid-tower collar) 230 surrounds the upper bearing assembly 220. This mid-tower collar may be the attachment for reinforcing guy wires 310 extending to the ground. It may also restrain the tower structure at the point of greatest separation 141 (kink) between the load bearing leading edge 110 and trailing edge 120. One embodiment may incorporate a kink design in the leading edge to facilitate the turning of the tower in response to changes in wind direction, by placing a downwind rotor substantially downwind of the tower rotation axis. In another embodiment, the turbine is turned by use of a yaw motor.

With reference to FIG. 2A, the leading edge 110 is illustrated to comprise a half circle with a radius 111. The trailing edge 120 is also illustrated to be a half circle with a radius 121. The leading edge and trailing edge carry the tension and compression load of the structure, including the rotor and nacelle weight. The leading and trailing edges may comprise steel having a high modulus of elasticity. The radius 121 of the trailing edge 120 can be smaller than the radius 111 of the leading edge 110. Conversely, the radius of the leading edge can be smaller than the trailing edge. This configuration allows the trailing edge to be stored within the leading edge for transportation (or vice versa).

The half circle shape enhances the load bearing capacity of the steel, in contrast to an equal thickness of sheet steel, because the curved shape provides self stability against buckling. Continuing to reference FIG. 2B, the top cross sectional view shows a tower embodiment having a more elliptical shape. Other embodiments can include a leading edge or trailing edge having a parabolic shape or a shape tapering to a wider or narrower crosswind dimension.

In addition to the leading edge 110 and trailing edge 120, FIGS. 2A and 2B illustrate a third element of the tower, i.e., panels 135 that cover the tower sides. These panels may cover both sides of the tower, creating a hollow interior space 136. The panels are attached to the leading edge and the trailing edge. FIGS. 2A and 2B illustrate one method of attachment wherein the panel 135 fits underneath the side edge 137 of the leading edge 110. Conversely, the side panel fits over 138 the side edge of the trailing edge 120. The attachment mechanisms can be bolts, screws or clips and are loaded in shear, i.e., the attachment mechanism primarily tries to slide laterally in contrast to being pulled apart. A primary structural or sealant bond may be optionally provided.

The attachment method described above, i.e., the leading edge fitting over the side panel and the side panel fitting over the trailing edge and in line with the air flow, advantageously minimizes debris and moisture blowing into the joints or hollow space 136 of the tower. The wind direction is illustrated by vector arrow 975. This attachment method also reduces drag on the tower. The leading edge 110 is pointing into the wind.

The side panels will experience in-plane, shear and air loads. These secondary loads are significantly less than the loads of the leading and trailing edges. Accordingly, the side panels can be fabricated of lightweight secondary material. This, of course, reduces the weight of the tower. Side panel materials may include but are not limited to fiberglass, balsa or foam core within fiberglass skin panels, fiber reinforced plastics or non reinforced plastic. A diagonal truss structure with covering may also be used. The panels may be lower cost materials relative to the material used for the tower edges.

The leading edge 110 will experience both compression and tensile loads. The compression load comes from the weight of the rotor and nacelle. The tensile force will arise from, at least in part, the thrust action of the wind on the turbine rotor blades. When the leading edge is directed into the wind with the turbine operating, there will be thrust induced bending, simultaneous with compression from carrying weight from the turbine rotor and nacelle. The leading edge must carry the net resultant of these compression and tension loads. The trailing edge 120 will experience compression from the thrust force and from the weight load, and must be stable against buckling. Due to the disparity of these forces and that the tower components are fabricated as separate pieces or segments, the leading edge can easily be made thinner than the trailing edge, thereby saving on material and transportation costs.

The lower portion of the tower (below the upper bearing assembly) sees more compression than the upper tower portion due to the load from the anchored and tensioned guy wires. Again, since the tower segments may be fabricated separately, the thickness of the tower leading edge and trailing edge can be greater below the upper bearing assembly.

Figure 3:
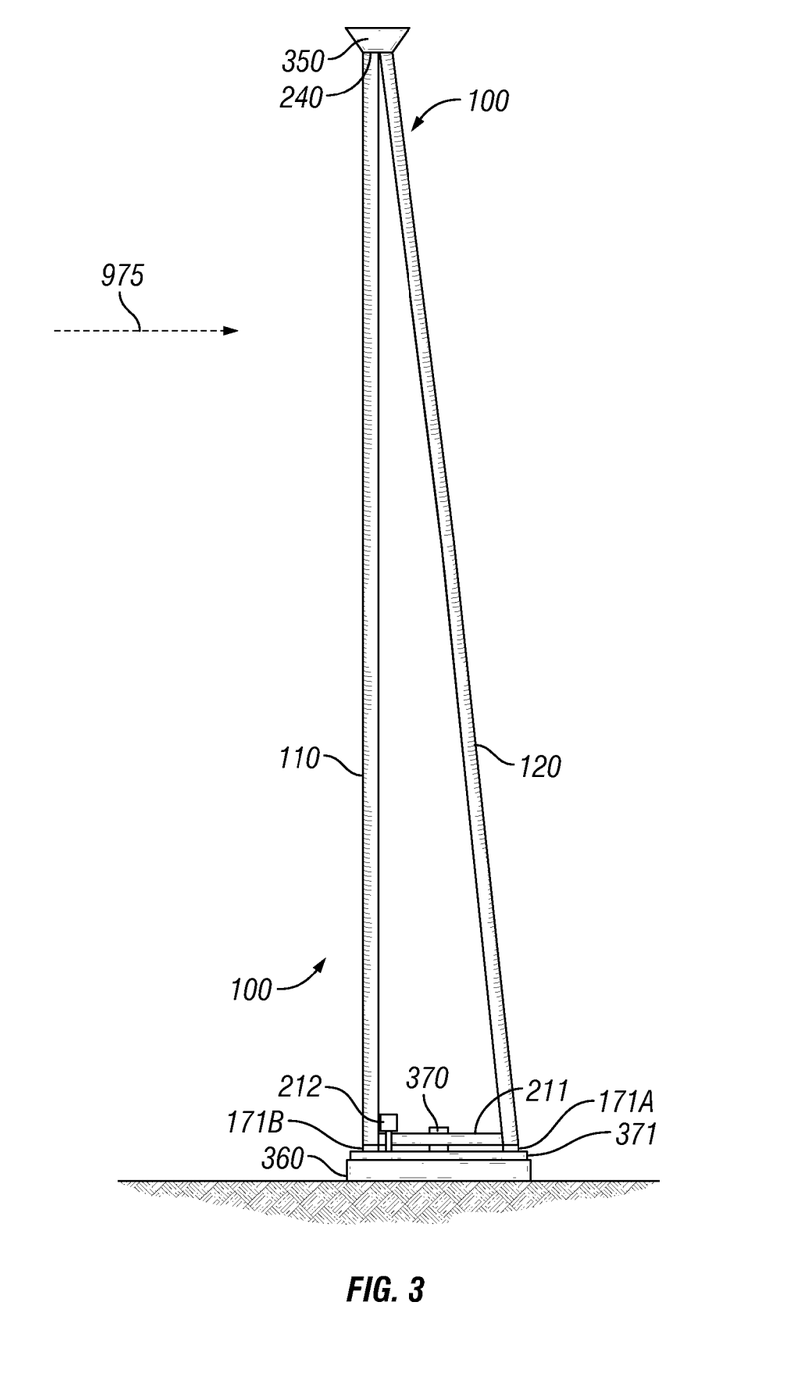
FIG. 3 illustrates a side view of an alternate embodiment forming a triangle shape wherein a vertical leading edge is supported by a straight but angled trailing edge. Also illustrated is the horizontal structural member connecting the leading edge and the trailing edge. Also illustrated are the turntable bearings, turning on the edge of the frame, allowing rotation of the tower on the base.

FIG. 3 illustrates another embodiment of the tower 100. The tower leading edge 110 may be vertical. The trailing edge 120 slopes in a linear fashion from the junction 240 with the leading edge. This junction supports the nacelle or rotor attachment fixture 350. The tower enjoys a wider base 371 resting on a pivot stalk 370 and a foundation 360.

Illustrated in FIG. 3 are rotating mechanisms 171A, 171B, i.e., turntable bearings, turning on the edge of the frame 100 allowing rotation of the tower within the base. Also illustrated is a yaw motor 212 to power the rotation. The leading edge and the trailing edge are connected by a horizontal frame component 211. The relationship of the leading edge to the wind is illustrated by vector arrow 975 representing the wind direction.

In an alternative embodiment, the tower may rotate on a turntable component. This may comprise a horizontal rotating plate mounted on the foundation. The tower base would be attached to the plate or disk component.

Figure 7:
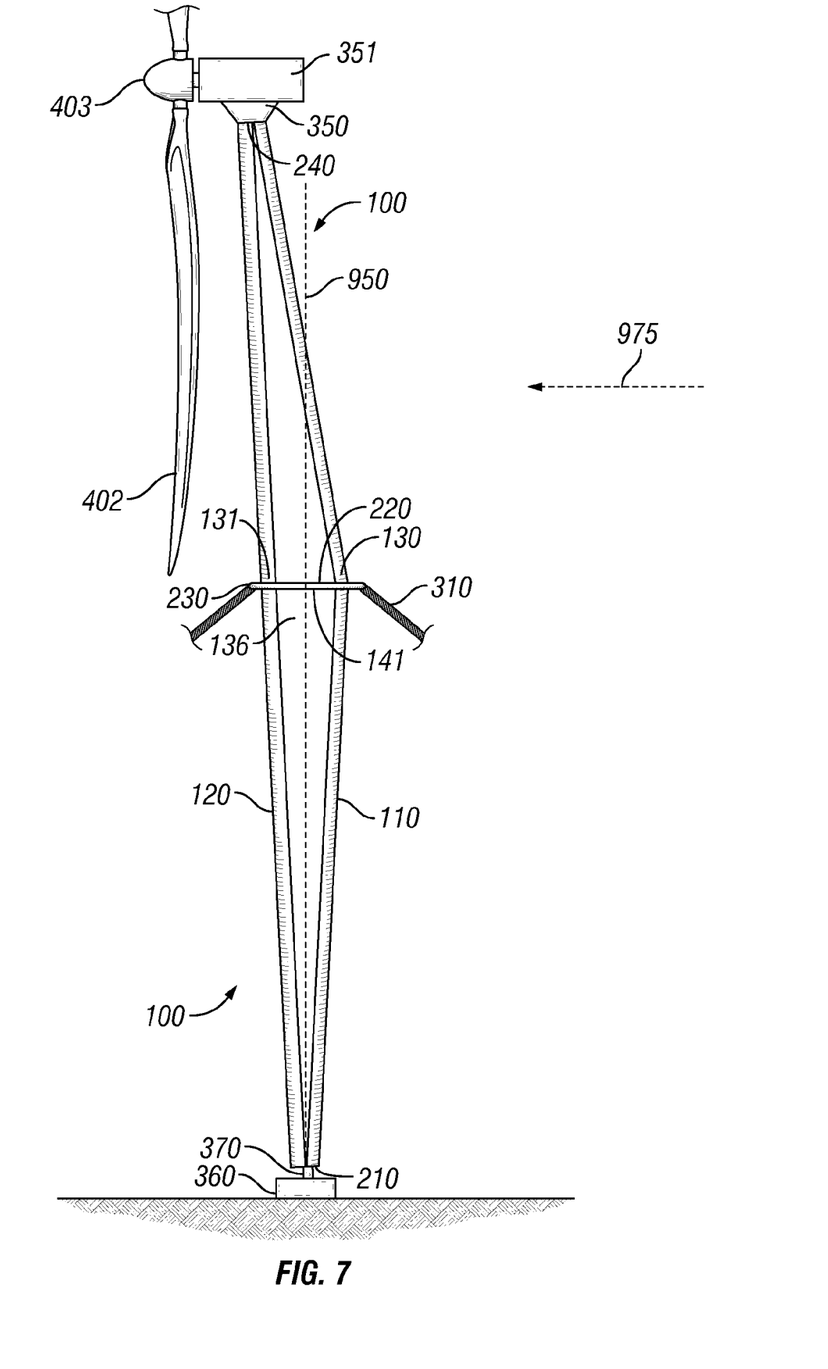
FIG. 7 illustrates a downwind oriented turbine.
Figure 8:
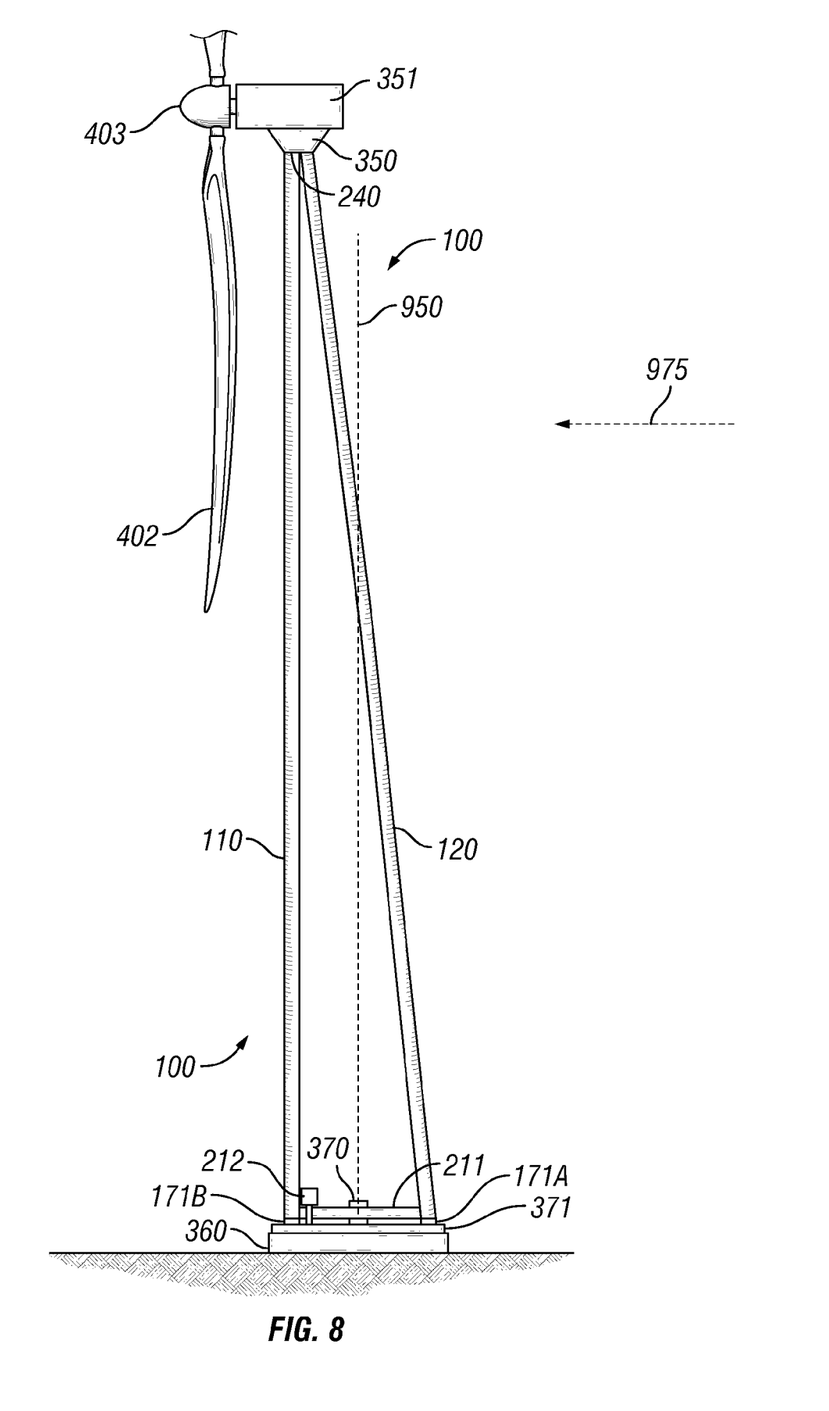
FIG. 8 illustrates a downwind oriented turbine having the tower leading edge and turbine directed into the wind.

In another embodiment, a downwind rotor is attached to the trailing edge of the tower. See FIG. 7. The downwind rotor provides the mechanism for rotating the tower and turbine in response to changes in wind direction. The downwind rotor would be mounted sufficiently distant from the tower vertical axis of rotation to provide the yaw alignment forces. The leading edge may slant downwind, and the trailing edge may be vertical or also slant downwind, to aid the downwind placement of the rotor.

The ability to choose the thickness, shape, and local radius of curvature of the trailing edge part enhances the buckling stability of the trailing edge while minimizing its weight and cost. Similarly, these characteristics could be varied for the leading edge as a function of height to minimize weight and cost. The thickness of the tower i.e., the separation between side panels, could also be varied with height if this provides lower weight and cost, by varying the edge to edge crosswind width dimensions of the leading and trailing edge pieces.

Figure 4:
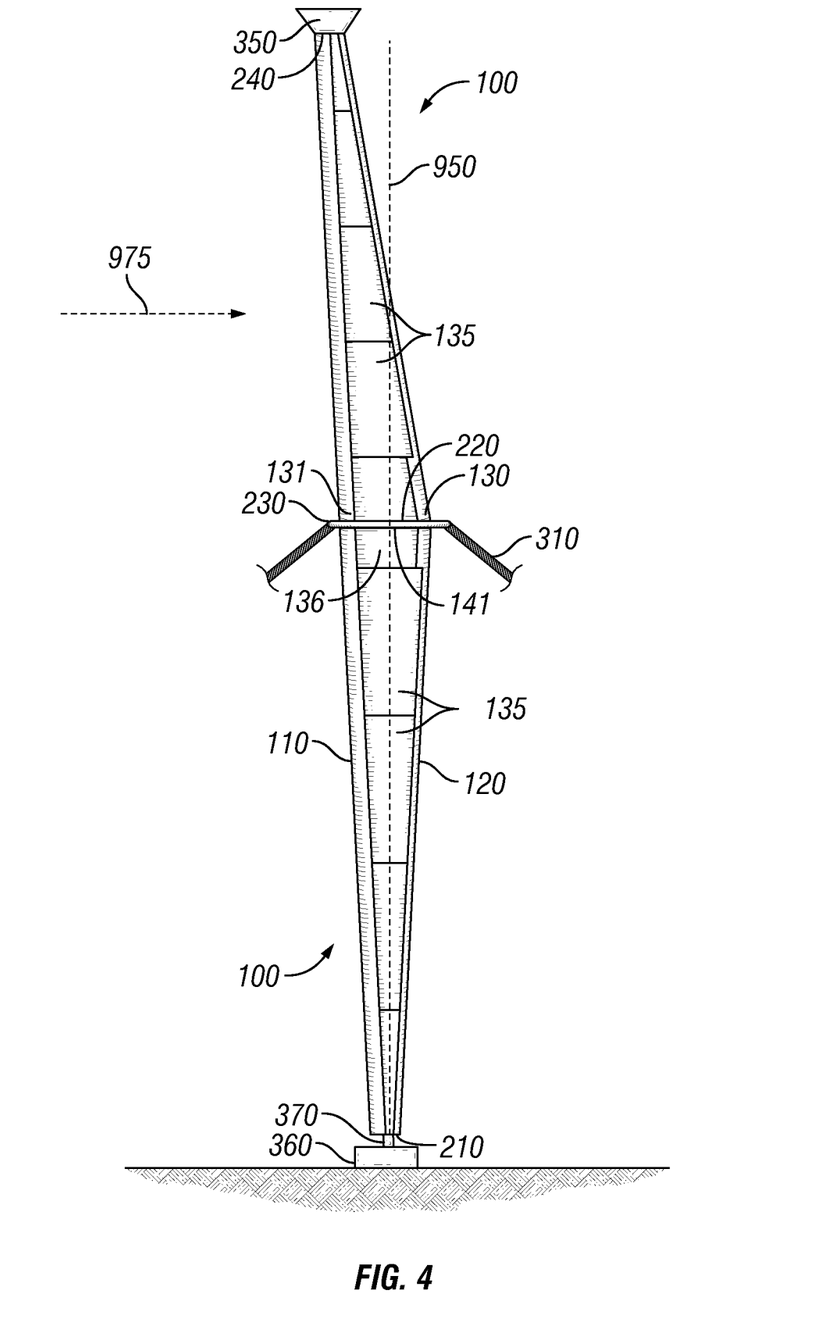
FIG. 4 illustrates the tower of FIG. 1 leaning into the wind wherein multiple side panels are mounted between the leading edge and trailing edges. Panels are mounted on both sides of the tower structure. The vertical axis of rotation is illustrated.

FIG. 4 illustrates the leaning tower structure 100 depicted in FIG. 1 with the addition of the side panels 135 spanning the space 136 between the leading edge 110 and trailing edge 120. The side panels need carry only modest amounts of shear and bending loads. The vertical axis of rotation is shown extending from the pivot stalk 370 and through the middle of the mid tower collar 230. It extends outside the tower structure. FIGS. 2A and 2B illustrate an embodiment of attaching the side panels to the leading and trailing edges.

Also illustrated are the mid-tower collar 230 and guy wires 310, the tower structure midpoints 130,131 and the bearing assembly 220. Also illustrated is the merging of the leading and trailing edges 240, the nacelle attachment component 350, the bottom pivot post 370, the foundation 360.

Figure 5:
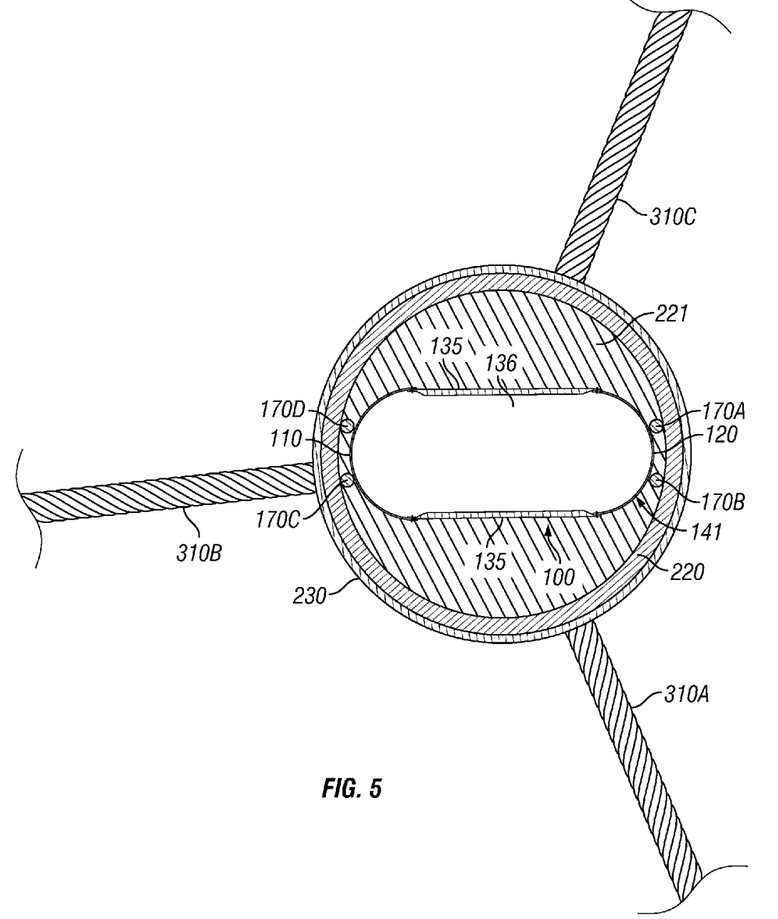
FIG. 5 is a top cross sectional view of the tower and the mid-tower collar, upper bearing assembly and the inner collar.

FIG. 5 illustrates an embodiment for supporting the tower and allowing the tower to rotate. Illustrated is a top cross sectional view showing the tower comprising the leading edge 110, the side panels 135, and the trailing edge 120. The tower edges carry rotating bearings 170A thru 170D or similar components that are in contact with the circular surface 220 of the bearing assembly. Also illustrated are three guy wires 310A, 310B, 310C, attached to the mid tower collar 230. Also shown is the space 136 between the tower edges 110, 120. The mid-tower collar surrounds the upper bearing assembly and provides structural reinforcement.

The tower structure 100 may also include an inner collar 221. This collar 221 can be a flat plate surrounding the tower and attached to it at or near its widest point. The inner collar rotates with the tower with the upper bearing assembly. In FIG. 5, the area between the bearing assembly 220 and tower 100 is filled with a planar structure, possibly made from a flat plate, or plate with holes to make it lighter. The bearings may be in a few discrete locations as shown, or distributed more widely around the inside perimeter of the upper bearing assembly 220. The inner collar stops the tower from deforming out of shape at the kink. Alternatively, a planar structure on the inside would restrain the shape and achieve the same result.

This specification is to be construed as illustrative only and is for the purpose of teaching those skilled in the art the manner of carrying out the invention. It is to be understood that the forms of the invention herein shown and described are to be taken as the presently preferred embodiments. As already stated, various changes may be made in the shape, size and arrangement of components or adjustments made in the steps of the method without departing from the scope of this invention. For example, equivalent elements may be substituted for those illustrated and described herein and certain features of the invention maybe utilized independently of the use of other features, all as would be apparent to one skilled in the art after having the benefit of this description of the invention.

While specific embodiments have been illustrated and described, numerous modifications are possible without departing from the spirit of the invention, and the scope of protection is only limited by the scope of the accompanying claims.

What I claim is:

1. A rotating wind turbine tower comprising:
   a) a leading edge and a trailing edge carrying tower tension load and compression load;
   b) a variably dimensioned space between the leading edge and the trailing edge;
   c) an upper bearing assembly positioned below an upper tower segment;

d) a mid-tower collar surrounding the upper bearing assembly;
e) a plurality of guy wires attached to the mid-tower collar and extending to a ground; and
f) a bottom bearing assembly.

2. The rotating wind turbine tower of claim 1 comprising a tower rotation axis centered in a bottom bearing assembly and extending vertically upward.

3. The rotating wind turbine tower of claim 1 further comprising the leading edge having a substantially vertical orientation and extending from the bottom bearing assembly to a rotor and nacelle base.

4. The rotating wind turbine tower of claim 1 further comprising the trailing edge having a broadened kinked or bowed separation from the leading edge and tapering toward the leading edge proximate to each tower end.

5. The rotating wind turbine tower of claim 1 further comprising the mid-tower collar laterally reinforcing the leading edge and the trailing edge.

6. The rotating wind turbine tower of claim 4 comprising an upper bearing assembly positioned proximate to the broadened kink or bowed separation of the trailing edge and leading edge.

7. The rotating wind turbine tower of claim 4 further comprising a portion of both the leading edge and trailing edge kinked or bowed away from the opposing trailing edge and leading edge respectively.

8. The rotating wind turbine tower of claim 1 further comprising a trailing edge extending upward linearly from a horizontal frame component attached to the bottom bearing assembly and the trailing edge having an angled relationship with the leading edge thereby forming a load carrying triangle with the leading edge.

9. The rotating wind turbine tower of claim 1 further comprising the leading edge includes a first radius and the trailing edge includes a second radius wherein one radius is smaller than the other radius.

10. The rotating wind turbine tower of claim 1 comprising a covering over the space between the leading edge and the trailing edge and the covering further comprising load bearing material for shear, air loads or sideways bending.

11. The rotating wind turbine tower of claim 10 further comprising the leading edge and the trailing edge made of metal and the covering comprising a light weight material.

12. The metal of the rotating wind turbine tower of claim 11 further comprising steel.

13. The covering of claim 10 further comprising the leading edge overlapping the covering and the covering overlapping the trailing edge.

14. The rotating wind turbine tower of claim 1 further comprising the leading edge, the covering and the trailing edge and a downwind rotor extending beyond the trailing edge whereby a downwind rotor trailing the tower rotation axis can rotate the tower in response to changes in wind direction.

15. The rotating wind turbine tower of claim 1 further comprising a turbine mounted to the top of the turbine tower and proximate to the tower rotation axis.

16. The rotating wind turbine tower of claim 1 further comprising the leading edge providing load carrying for tension force when oriented to the wind and the trailing edge providing load carrying for compressive force.

17. The rotating wind turbine tower of claim 1 comprising multiple attachable segments that can be assembled to form the rotatable turbine tower leading edge and trailing edge whereby the segments can be fabricated to meet the loads placed on each segment dependent on the segment's position on the tower.

18. The rotating tower structure of claim 1 comprising a hinge connected to the tower bottom, or the bottom bearing assembly.

19. A wind turbine tower that rotates with changes in wind direction comprising multiple segments further comprising each segment maintaining the same orientation to the wind and the segments are fabricated to carry tower loads, and the multiple segments joined together, present a single unified, aerodynamic shapes relative to the wind.

20. A method of maintaining a turbine oriented to the wind comprising:
(a) mounting a turbine on a rotatable tower whereby the tower has a load bearing leading edge and a load bearing trailing edge and the turbine is directionally aligned with the leading edge;
(b) attaching the tower to a bottom bearing assembly at a tower base; and
(c) using a downwind rotor attached in a trailing position of the trailing edge extending outside the tower rotation axis to rotate the tower in response to changes in wind direction so that the tower leading edge and turbine are directed into the wind.

21. The method of claim 20 further comprising:
(a) installing an upper bearing assembly at the mid tower position;
(b) installing a mid-tower collar surrounding the upper bearing assembly;
(c) constructing the tower with at least a portion of the tower having a broad surface parallel to the wind direction; and
(d) constructing the tower leading edge and trailing edge to minimize wind turbulence.

22. The method of claim 20 further comprising a rotatable tower structure comprising:
(a) constructing a vertically oriented linear leading edge;
(b) constructing a linear trailing edge merging into the leading edge at the top of a tower structure
(c) installing a horizontal frame component at the bottom of the tower structure connecting the leading edge to the trailing edge; and
(d) installing the tower structure upon a bottom bearing assembly.

23. The method of claim 22 further comprising installing the tower structure with a turntable bearing.

24. A method of improving a rotating wind turbine tower comprising:
(a) the entire vertical height of the leading edge leans forward of the tower rotation axis;
(b) increasing a distance between a rotating tower leading edge and a plane of the rotation of rotor blades; and
(c) reducing the tower moment induced by thrust from rotation of the rotor blades.

25. The method of claim 24 further comprising reducing a quantity or diameter size of guy wires by reduction of the moment achieved by the tower, nacelle and rotor leaning ahead of the axis of rotation.

* * * * *